Jan. 13, 1970  K. I. VORONITSYN ET AL  3,489,190
METHODS AND INSTALLATIONS FOR STRIPPING TREES OF THEIR BRANCHES
Filed Oct. 26, 1966  2 Sheets-Sheet 2

United States Patent Office 3,489,190
Patented Jan. 13, 1970

3,489,190
METHODS AND INSTALLATIONS FOR STRIPPING TREES OF THEIR BRANCHES
Konstantin Ivanovich Voronitsyn, Leningradsky prospekt 66, kv. 147, Moscow; Yakov Mikhailovich Glebov, pos. Kresttsy, ulitsa Lesnaya, 30, kv. 5, Novgorodskaya oblast; Gely Klavdievich Stupnev, Ulitsa Osipenko, 4, kv. 27, Khimki; Igor Mikhailovich Mashatin, pos. Kresttsy, ulitsa Strolitelei, 9, Novgorodskaya oblast; and Nikolai Mikhailovich Volchkov, prospekt Vernadskogo, 9/10, kv. 55, Moscow, U.S.S.R.; and Grigory Sergeevich Pitko, pos. Kresttsy, ulitsa Bezymyannaya 8; Pavel Ivanovich Zheglov, pos. Kresttsy, ulitsa Lesnaya, 30 kv. 15; Vyasheslav Mikhailovich Dakhin, pos. Kresttsy, ulitsa Ostrovskaya, 29, kv. 8; and Nikolai Vasilievich Nikolaev, pos. Kresttsy, pereulik Nekrasova, 1; all of Novgorodskaya oblast, U.S.S.R.; and Boris Nikolaevich Krasilnikov, pos. N.-Malino, 10, kv. 8, Krjukovo Moskovskoi oblasti; and Mikhail Ivanovich Brik, pos. Kresttsy, ulitsa Lesnoya, 20, Novgorodskaya oblast, U.S.S.R.
Filed Oct. 26, 1966, Ser. No. 589,708
Int. Cl. B27c 9/60; B27m 3/00
U.S. Cl. 144—2     5 Claims

ABSTRACT OF THE DISCLOSURE

A method and apparatus for delimbing trees in which pre-felled and packed trees are shuffled by being displaced in the transverse and longitudinal directions on a helical line one relative to another, during simultaneous rotation of the trees about their axes. A hopper-type installation is provided with continuous chains with catching elements arranged on an inclined side wall and imparting motion to the pack of tree trunks being treated, as well as with cutting elements in the form of flat knives. As a result of the displacement of the tree trunks in the installation, the trunks collide with one another and with the knives and the branches broken and their remnants are trimmed.

---

The present invention relates to methods and installations for stripping trees of their branches. Known methods of stripping trees of their branches involve individual processing of trees in a debranching machine by passing them therethrough in the direction of their longitudinal axis. The cutting members of the known debranching machines are knives or cutters, arranged uniformly along the machine and around the tree being debranched while moving along its longitudinal axis.

Individual handling of trees and their longitudinal travel along the cutting members make the known debranching machines rather inefficient and impair the quality of processing, that is, fail to insure complete removal of branches.

An object of the present invention is to eliminate these disadvantages.

A further object of this invention is to provide a method of removing branches from trees and an installation for implementing this method so as to obtain high quality debranching, i.e. complete removal of the branches, and high output rate.

According to the invention these objects are achieved by making the felled and packed trees move in a transverse direction with respect to their axes relative to each other as well as rotate the trees about their axes. The proposed debranching installation comprises a series of conveyer units for forcing the trees to move in transverse direction, said conveyer units being mounted on a bed and having their working parts arranged along an inclined surface, at the lower portion of which a shield is provided to take up the impact of the moving trees and to retain these trees on the inclined surface of said conveyer units.

The conveyer units can be constructed as continuous chains carrying catching elements to hold the trees. In order to prevent the trees from being hurled over and out of the debranching installation special stop legs are provided near the upper parts of the continuous chains.

Next, in order to align the butts of the trees the continuous chains are inclined in relation to the longitudinal axis of the installation while the end of the installation, which faces the butts of the trees, is provided with a transverse wall.

Finally, in order to improve the quality of debranching, the shield is furnished with cleaning knives. Special frames with additional cleaning knives are fixed on the bed between the continuous chains.

The present invention will become more apparent from the following description of its preferred embodiment with reference to the accompanying drawing, wherein.

Figure 1:
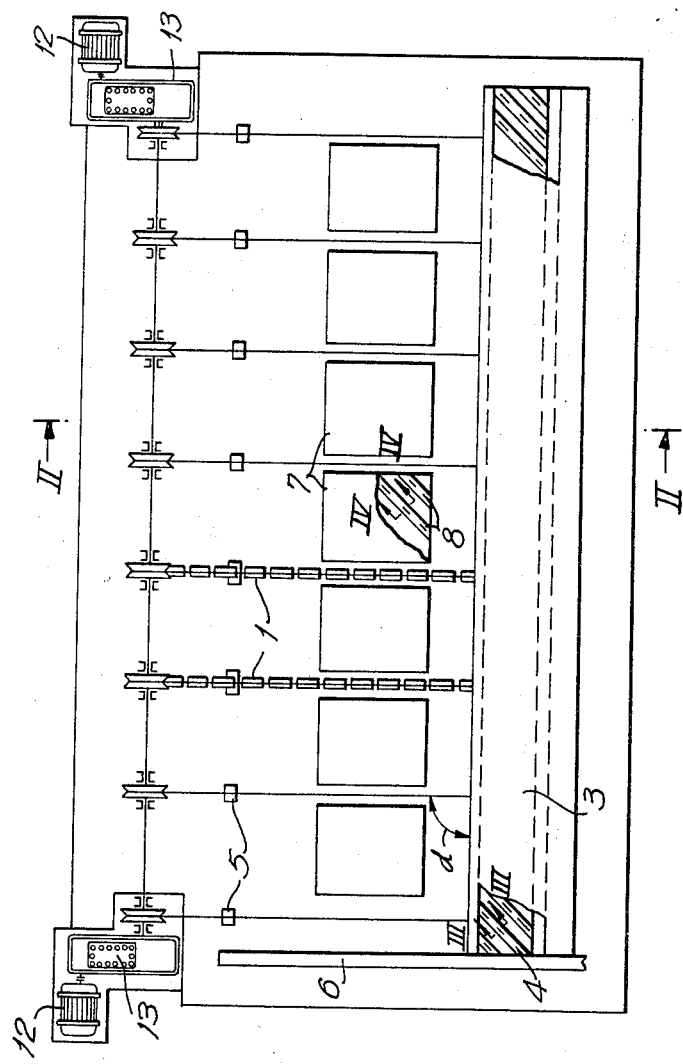
FIG. 1 is a diagrammatic plan view of an installation for stripping trees of their branches.
Figure 2:
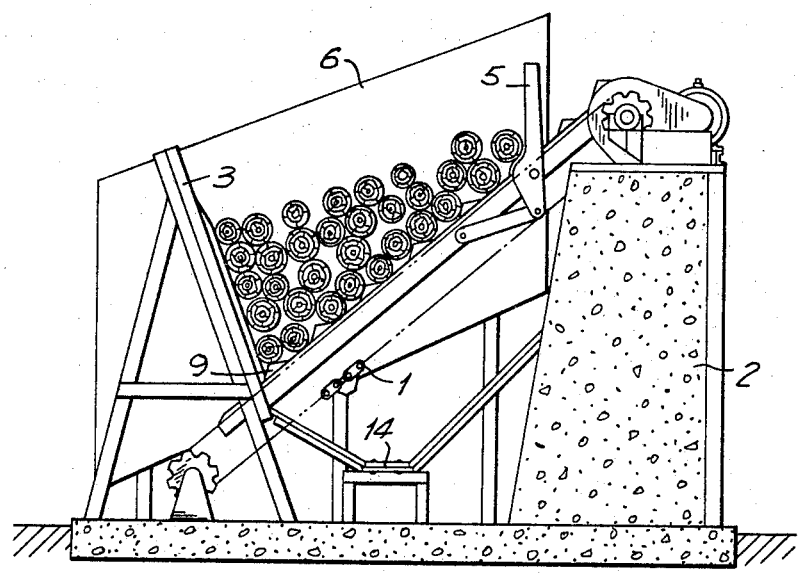
FIG. 2 is a sectional view taken along line II—II of FIG. 1.

The installation shown in FIGS. 1 and 2 in the drawing comprises a series of continuous chains 1 mounted on the bed 2 in an inclined position and parallel to each other, a shield 3 with cleaning knives 4, stop legs 5, and wall 6 and frames 7 carrying additional cleaning knives and arranged between said continuous chains. The continuous chains are inclined at an approximate angle of 87° to the longitudinal axis of the installation and towards the end wall 6. The working parts of the continuous chains form an inclined surface upon which the packs of trees are laid. To hold the trees on the inclined surface, formed by the continuous chains, and to make them move upwards together with the chains, the chains are equipped with catching elements, such as claws 9.

Figure 3:
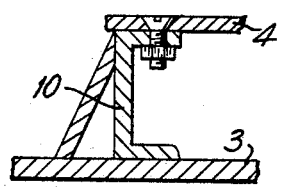
FIG. 3 is a sectional view taken along line III—III of FIG. 1, showing how the cleaning knives are fastened to the shield.
Figure 4:
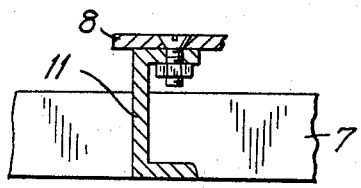
FIG. 4 is a sectional view taken along line IV—IV of FIG. 1 showing how the additional cleaning knives are fastened.

The cleaning knives 4 (FIG. 3) are spaced from one another and installed in spaced relation and parallel to the plane of the shield 3 and are fastened to said shield by means of channels 10 so as to extend at an acute angle relative to the longitudinal axis of the installation and at an acute angle relative to the conveyor units. The cutting edges of the knives 4 face in the direction of movement of the trunks. The additional cleaning knives 8 are secured to frames 7 by means of similar channels 11, said knives 8 being level with the working portion of conveyor units 1 whereby the branches are cut flush with the trunk surface.

The continuous chains 1 are driven by electric motors 12 via reduction gears 13.

The process of debranching is effected as follows.

By means of conventional boom loaders a pack of felled trees is fed into the installation so as to be placed on the inclined surface formed by the continuous chains. When driven by the electric motors, the continuous chains, by their claws 9, move the trees upwardly until they reach the stop legs 5. Then the trees roll down and after striking against the shield 3 with cleaning knives 4, fall back on the continuous chains 1 which raise them again.

As a result of transverse displacement of the tree trunks relative to each other, their rotation about their axes and their striking against the shield 3 and against each other, the branches get broken. Simultaneously, by virtue of the fact that the knives 4 and 8 have cutting edges directed against the movement of the tree trunks, the branches are cut off and their remnants trimmed.

Moreover, the displacement of the tree trunks in the planes of the knives protects the surface of the trunks from being damaged by the knives. Inclination of the continuous chains 1 in relation to the longitudinal axis of the installation and towards its end wall 6, provides for the displacement of the tree trunks towards wall 6 and alignment of the butt ends of all the trees against the end wall. The branches, cut from the trees, fall through the spaces between the continuous chains 1, shield 3 and frames 7, and by means of a conveyer 14 are taken away from the installation. The whole pack of debranched trees is then conveyed by unloading means to other machines for further processing.

With boles averaging 0.3–0.4 cu. m. in volume and packs of 20 cu. m. average volume, the hourly output of the proposed installation is 60–70 cu. m.

What is claimed is:

1. A method for stripping trees of their branches, comprising providing relative movement of felled and packed trees in a transverse direction with respect to their axes while rotating said trees about said axes.

2. An installation for delimbing tree trunks, comprising: a bed; means on said bed defining a surface inclined with respect to the horizontal plane; a series of parallel conveyor units arranged on said surface; catching elements secured on said conveyor units; a shield with primary cutting elements mounted at the lower portion of said inclined surface to withstand impact of the tree trunks and to retain the latter on said conveyor units; secondary cutting elements disposed between said conveyor units; stop means at the upper portion of said inclined surface to prevent the tree trunks from leaving the inclined surface; and a transverse wall to align the butt ends of trunks.

3. An installation according to claim 2 in which said primary cutting elements are flat knives installed at a distance from the shield and from each other and extending at an angle relative to the longitudinal axis of the installation, said secondary cutting elements being spaced flat knives secured at positions level with the conveyor units and at an angle relative to the latter; said knives having cutting edges facing opposite the direction of movement of the tree trunks.

4. An installation according to claim 3 in which the knives are parallel to the surface on which they are installed.

5. An installation according to claim 2 in which the chain conveyor units are inclined with respect to the longitudinal axis of the installation to provide for the displacement of tree trunks on a helical line and for the alignment of their butt ends.

References Cited
UNITED STATES PATENTS

| | | |
|---|---|---|
| 1,281,155 | 10/1918 | Guettler. |
| 1,889,046 | 11/1932 | Foss. |
| 2,137,452 | 11/1938 | Hillbom. |
| 2,647,548 | 8/1953 | Guettler. |
| 2,657,722 | 11/1953 | Hillbom. |
| 3,228,440 | 1/1966 | Ferrabee. |

FRANK T. YOST, Primary Examiner

U.S. Cl. X.R.
144—208, 309